Sept. 16, 1969  M. J. PARISI  3,467,132
BEER KEG FITTING WITH LIMIT STOPS
Filed Dec. 1, 1966
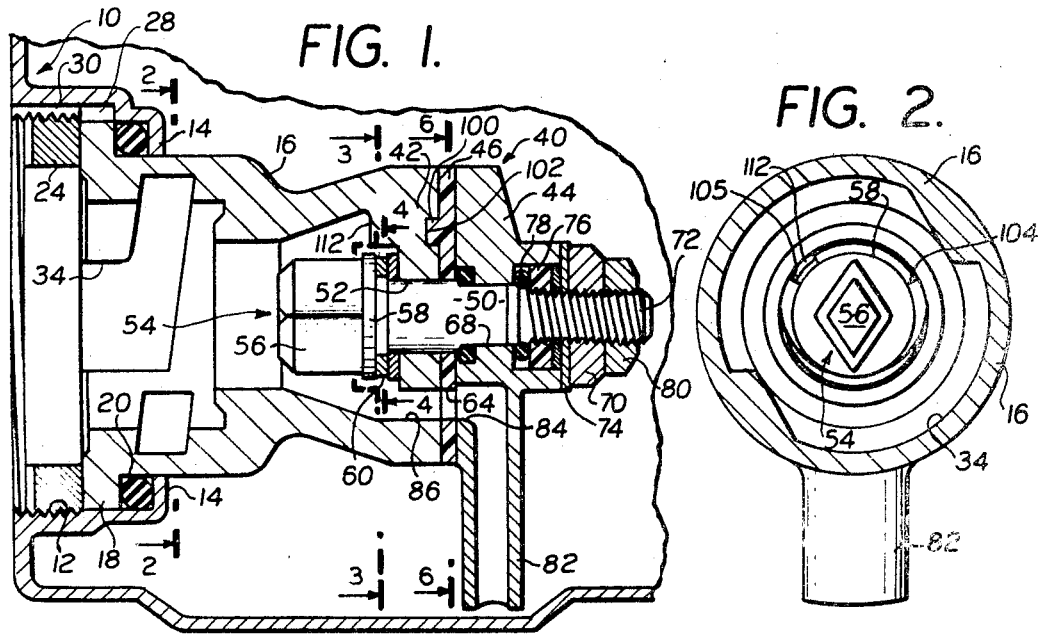
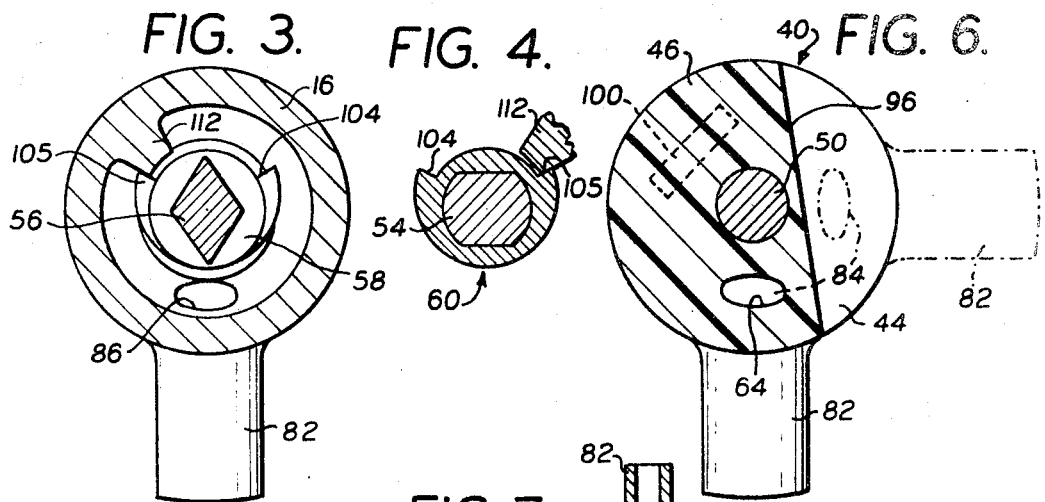
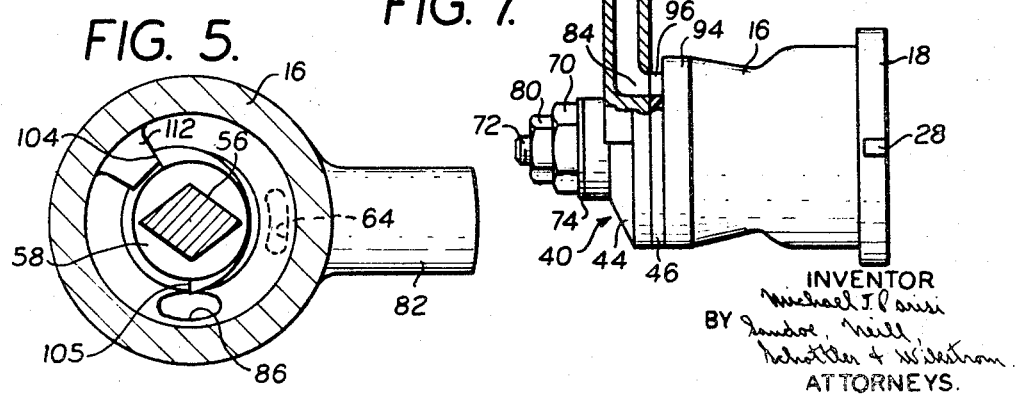
INVENTOR
Michael J. Parisi
BY
ATTORNEYS.

United States Patent Office 3,467,132
Patented Sept. 16, 1969

---

3,467,132
BEER KEG FITTING WITH LIMIT STOPS
Michael J. Parisi, Paramus, N.J., assignor to Vending Components, Inc., Hackensack, N.J., a corporation of New Jersey
Filed Dec. 1, 1966, Ser. No. 598,470
Int. Cl. F16k *51/00*
U.S. Cl. 137—323                                10 Claims

ABSTRACT OF THE DISCLOSURE

A beer keg valve having a body portion which inserts into an opening in the keg and a valve at the inner end of the body limited to 90° rotation by abutments on the valve stem which strike against complementary abutments integral with the inside surface of the valve body.

SUMMARY OF THE INVENTION

This invention relates to valves that are used for withdrawing beer from beer kegs.

One of the common types of valves used with beer kegs has a recessed body that extends through the side of the keg and that has a valve-operating stem of polygonal cross section in the recess for receiving the socket end of a wrench or fitting that rotates the stem 90° to open or close a valve at the end of the recessed body.

A complementary fitting that is used to connect the valve with a customer's beer line has lugs which fit into bayonet-type grooves in the recessed housing, and this limits the rotary movement of the valve to a quarter turn. The valve is open when the fitting is at one end of the bayonet recesses and is closed when the fitting is turned to the other limit of the rotary movement permitted by the bayonet recesses. When the valve is operated with a wrench that has no stop lugs, it may beturned into a position where it is not properly oriented for operation by a subsequent inserting of the customer's fitting.

With the newer "Snorkel" valves, having an inlet conduit on the valve which extends downward into the peripheral depression in the bottom of a keg, it is especially important to have the valve and its associated Snorkel or inlet conduit stop at the proper phase angle so that the inlet conduit is not only down when the valve is open, but is at the proper orientation for washing when the valve is closed and the keg is being washed at a brewery prior to refilling.

It is an object of this invention to provide a stop for the valve in a valve assembly of the character indicated. More particularly, it is an object to provide a positive stop that is combined with the other valve structure without requiring any substantial change in the valve and without any substantial increase in cost.

Valves of the type to which this invention is directed are commonly made with thrust washers on the valve-operating stem, and in preferred embodiment of this invention, the stops for the angular rotation of the stem are obtained by changing the shape of the thrust washer and locating an abutment on a cast body of the valve.

While the invention will be described in connection with a "Snorkel" valve, with which the invention is especially advantageous, it should be understood that the invention can be used on other valves of the Golden Gate type.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIGURE 1 is a vertical sectional view through a valve connected with a beer keg and made in accordance with this invention;

FIGURES 2, 3 and 4 are sectional views taken on the lines 2—2, 3—3 and 4—4, respectively, of FIGURE 1;

FIGURE 5 is a view similar to FIGURE 3 but showing the valve in closed position;

FIGURE 6 is a sectional view taken on the line 6—6 of FIGURE 1; and

FIGURE 7 is an elevation, on a reduced scale, and partly broken away and in section, of the valve shown in FIGURE 1 but with the valve in the position which it occupies when it is closed and the beer keg is turned on its side for washing.

DESCRIPTION OF PREFERRED EMBODIMENTS

FIGURE 1 shows a portion of a conventional beer keg 10 having a tapping opening 12 which is formed with a flange 14. The tapping apparatus of this invention includes a body 16 having a flange 18. A sealing element, such as an O-ring 20, is placed against the flange 14, and the body 16, with its associated structure, is pushed into the opening 12 until the flange 18 comes against the O-ring 20. A ring 24 is then screwed into a threaded portion of the opening 12, and this ring 24 clamps the flange 18 against the O-ring 20 and the keg flange 14. There is a key 28 on the body 16 and this key fits into a keyway 30 in the opening 12 so that the body 16 can be oriented in only one position when assembled with the keg 10.

The outer end of the body 16 (the left-hand end in FIGURE 1) has bayonet-type grooves 34 for receiving the stem of a faucet or other customer's fitting through which beer is to be withdrawn from the keg. There is a valve at the inner end (the right-hand end in FIGURE 1) of the body 16. This valve, indicated generally by the reference character 40, includes an end wall 42 of the body 16, an inlet fitting 44 which overlies the outside of the end wall 42, and a static seal 46 located between the end wall 42 and the inlet fitting 44. In broadly defining the invention, this seal 46 may be considered a composite part of the end wall 42.

The fitting 44 is held in assembled relation with the seal 46 and the end wall 42 by a stem 50 extending through a circular bearing 52 in the end wall 42 and the static seal 46. The stem 50 has a head 54 which is of non-circular and preferably polygonal cross section. In the construction illustrated, the head 54 has a diamond-shaped portion 56 for receiving the end of a socket wrench for turning the stem 50. The head 54 includes also a flange 58 which bears against thrust washers 60 and 61 which, in turn, bear against an area of the inside face of the end wall 42.

The stem 50 has a section 64, best shown in FIGURE 6, with flats 66 that pass through an opening 68 (FIGURE 1) in the inlet fitting 44. This opening 68 is of a cross section similar to the section 64 of the stem so that rotation of the stem causes the inlet fitting 44 to rotate as a unit with the stem to open and close the valve 40, as will be explained. There is a nut 70 screwed over a threaded end 72 of the stem 50. This nut 70 clamps a gland 74 against packing 76 located in a counterbore in the outside face of the inlet fitting 44.

The packing 76 preferably includes an O-ring 78 in the lower part of the counterbore, and the nut 70 is tightened to obtain the desired pressure on the packing 76 and is then tightened further to obtain sufficient friction between the inlet fitting 44 and the static seal 46 to prevent accidental rotation of the stem 50 and inlet fitting 44 as a result of vibration or impact with the outside of the keg. The nut 70 is held in any adjusted position by a jamb nut 80.

An inlet conduit 82 extends radially from the fitting 44 and communicates with an opening 84 through the inner face of the fitting 44. This opening 84 registers with a complementary opening 86, in the end wall 42, when the valve 40 is in open position, as shown in FIGURE 1.

With the parts in the positions shown in FIGURE 1, liquid in the keg 10 is forced up through the inlet conduit 82, and through the openings 84 and 86 into the interior of the body 16 through which the liquid flows to the faucet or other customer's fiting which is inserted into the open end of the body 16.

When the keg 10 is in upright position, as shown in FIGURE 1, and the valve 40 is open, then the inlet conduit 82 extends downward very close to the lowest part of the bottom of the keg so that substantially all of the liquid in the keg can be withdrawn.

Before washing the keg, the valve 40 is closed and this causes the inlet conduit 82 to turn clockwise through an angle of 90° into the position shown in FIGURE 5. Thus the closing of the valve 40 orientates the inlet conduit 82 so that it extends vertically upward when the keg is turned over on its side into a washing position that locates the keg bung (not shown) in a lowermost position for receiving a washing nozzle in accordance with conventional brewery practice. Some of the cleaning fluid sprayed into the interior of the keg 10 falls into the open upper end of the conduit 82 and drains freely through the conduit as a result of structure which will be explained in connection with FIGURE 6.

The static seal 46 does not extend across the full areas of the confronting faces of the end wall 42 and the inlet fitting 44. There is a shoulder 96 on the static seal 46 and beyond the shoulder 96 the confronting faces of the wall 42 and fitting 44 are spaced from one another to form, with the shoulder 96, a drain channel. When the inlet fitting 44 is turned clockwise 90° from the full-line position, which puts the opening 84 in register with the opening 86, to the dotted-line position, the opening 84 moves beyond the shoulder 96. With the conduit 82 so positioned, and the keg oriented so that the conduit 82 projects upward, cleaning fluid that enters the conduit 82 runs out freely through the opening 84 and into the channel beyond the shoulder 96 and between the outside surface of the end wall 42 and the confronting face of the inlet fitting 44.

In order to keep the opening 86 through the static seal 46 always in register with the portion of the opening 86 that opens through the end wall 42, provision is made for preventing rotation of the static seal 46 around the stem 50. This is best illustrated in FIGURES 1 and 6, which show an inner projection 100 of the static seal 46 extending into a complementary recess 102 in the outside surface of the end wall 42.

From the description thus far, it will be evident that it is essential to have the movement of the valve element in the right direction and to have it limited to 90°. This is provided for by the bayonet grooves 34 when the wrench that turns the stem 54 is an extension of a faucet or other customer's fiting, as previously explained; but this invention also provides protection against improper turning of the valve stem when it is operated by a socket wrench that has no lugs for extending into the bayonet grooves 34.

The first thrust washer 60 is shaped so that lugs 104 and 105 extend from the washer, as shown in FIGURES 3–5. The washer 60 has a non-circular center opening 107 which fits over a similarly shaped portion of the stem 54 so that the washer 60 rotates as a unit with the stem. These lugs 104 and 105 preferably have substantially radially extending abutment surfaces; and there is a projection 112 on the inside of the body 16 in the path of the lugs 104 and 105. Whenever the stem is turned in either direction to bring an abutment surface of one of the lugs 104 or 105 into contact with a surface of the projection 112, the stem can turn no further in that direction.

The angular spacing of the lugs 104 and 105 from one another, minus the width of the projection 112 between its abutment surfaces that contact with the lugs 104 and 105, is equal to 90° of rotation of the stem 54. The lugs 104 and 105 can have shapes different from the shape shown in the drawing and can extend longitudinally to contact with a projection of less longitudinal extent, but the illustrated construction has the advantage of greater compactness and lower cost, since the washer 60 is merely a flat stamping, and the projection 112 is an integral part of the casting which is commonly used to make the body 16 of the assembly. This change in shape of the thrust washer 60 and provision for the projection 112 in the recess of the cast body 16 adds substantially no extra cost to the assembly.

All parts of the assembly are preferably made of metal which is not corroded by beer, or other liquid with which it is intended to be used, except the seal 46. The latter is preferably made of polytetrafluoroethylene.

Although the invention has been described as embodied in a valve assembly having a radially projecting inlet conduit on the valve element; and as embodied in a valve having cleanout features, it can be used with older types of valves not having these features and with valves that do not have the seal 46 static with respect to the body. Various other changes and modifications can be made and some features can be used in different combinations without departing from the invention as defined in the claims.

What is claimed is:

1. A beer keg valve assembly including a body for extending through a wall of the keg near the lower end thereof, and for securing to said wall, the body having a recess therein opening toward and accessible from outside the keg, an end wall at the inner end of the recess with a passage therein for flow of beer from the keg, a valve rotatable with respect to the body into different positions for opening or closing the passage, a valve stem extending through the end wall of the body and operably connected with the valve for moving the valve into its different positions, the stem being rotatable in the end wall, a non-circular end of the stem in the recess for receiving a wrench or fitting for rotating the stem, and means in the recess for limiting the angular movement of the stem, said means including abutments on the stem and complementary abutments integral with the body and extending from an inside surface of the recess in the paths of movement of the abutments on the stem.

2. The beer keg valve assembly described in claim 1 characterized by the stem having a flange at its inner surface confronting the inside surface of the end wall, a thrust washer between the flange and the end wall, the thrust washer having lugs projecting from it at angularly spaced locations around its periphery, and a projection on the inside of the recess in the path of the lugs of the thrust washer, said lugs of the thrust washer and the opposite sides of the projection constituting the abutments and the complementary abutments.

3. The beer keg valve assembly described in claim 2 characterized by the valve confronting the end wall of the body on the side opposite the recess, and the stem extending through the valve, and means on the stem for holding the valve against the end wall.

4. The beer keg valve assembly described in claim 1 characterized by the valve being on the side of the end wall opposite the recess and being connected with the stem, means on the stem clamping the valve against the end wall, a washer on a non-circular portion of the stem and having an opening that fits the non-circular portion of the stem, lugs projecting from the washer and constituting the abutment means on the stem.

5. The beer keg valve assembly described in claim 4 characterized by the washer being adjacent to the side of the end wall that faces the inside of the recess, and a projection extending from the inside surface of the recess, the opposite sides of the projection constituting said complementary abutments.

6. The beer keg valve assembly described in claim 5 characterized by the washer being flat and the lugs being projecting portions of the periphery of the washer at angularly spaced locations around the washer, and the projection being a ridge that is integral with the end wall of the body.

7. The beer keg valve assembly described in claim 6 characterized by the body being a casting and the projection being of one piece with the rest of the casting, a flange on the stem clamping the washer against the end wall so that said washer serves also as a thrust washer for the stem.

8. The beer keg valve assembly described in claim 1 characterized by bayonet-type grooves in the inside surface of the recess near the outer end of the recess for limiting rotary movement of a customer's fitting which is inserted into the recess to rotate the stem, the limits of angular movement imposed by the bayonet-type grooves being substantially the same part of the rotary movement of the stem as the limits imposed by said abutments and complementary abutments.

9. The beer keg valve assembly described in claim 1 characterized by the valve being a generally disk-shaped piece on the outside of the end wall and having a port therein that registers with the passage in the end wall for one angular position of the valve, a conduit extending radially from the valve element for a distance substantially greater than the radial extent of the body, said conduit constituting a passage communicating with the port in the valve, the valve being connected with the stem and being rotatable with the stem, and the abutments in the recess limiting the angular movement of the valve element to approximately 90° so that the conduit extends toward the lower end of a keg when the valve is at one limit of its travel.

10. The beer keg valve assembly described in claim 1 characterized by the valve assembly being immovably secured to a side wall of a keg, a flange on the outside of the body in contact with a surface of the keg around the keg opening through which the body extends, the stem having a diamond-shaped cross section at its end which faces the open end of the recess, the valve being connected with the stem for rotation as a unit with the stem so that the position of the diamond-shaped end of the stem idicates the position of the valve for an angular movement up to 90°.

References Cited

UNITED STATES PATENTS

| | | | |
|---|---|---|---|
| 330,861 | 11/1885 | Wuerpel | 251—287 X |
| 1,315,741 | 9/1919 | Pranold | 251—287 X |
| 2,992,654 | 7/1961 | Doremus et al. | 137—323 |
| 2,994,341 | 8/1961 | Leopold et al. | 251—287 X |
| 3,107,546 | 10/1963 | Rowland | 251—288 X |
| 3,279,493 | 10/1966 | Zurit et al. | 137—323 |

WILLIAM F. O'DEA, Primary Examiner

D. R. MATTHEWS, Assistant Examiner

U.S. Cl. X.R.

251—149, 288